Nov. 18, 1958 W. J. FOWLER 2,860,535
SEAL INSTALLATION TOOL
Filed Feb. 20, 1956
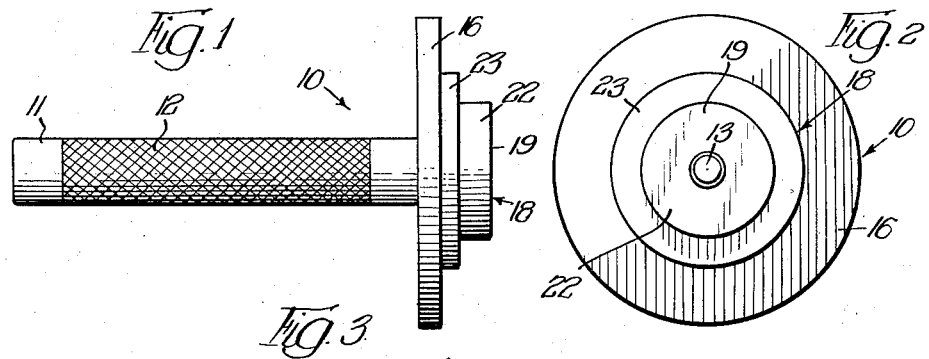
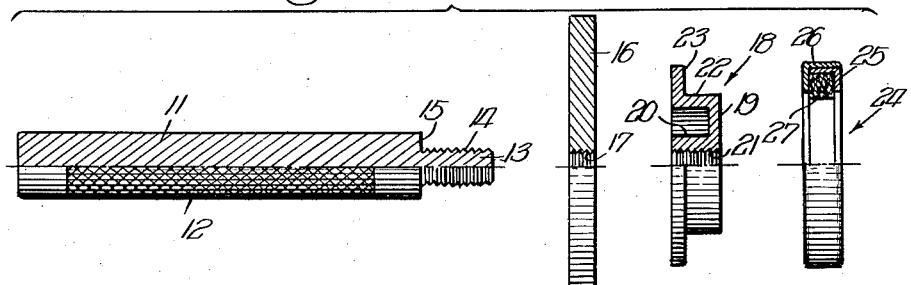
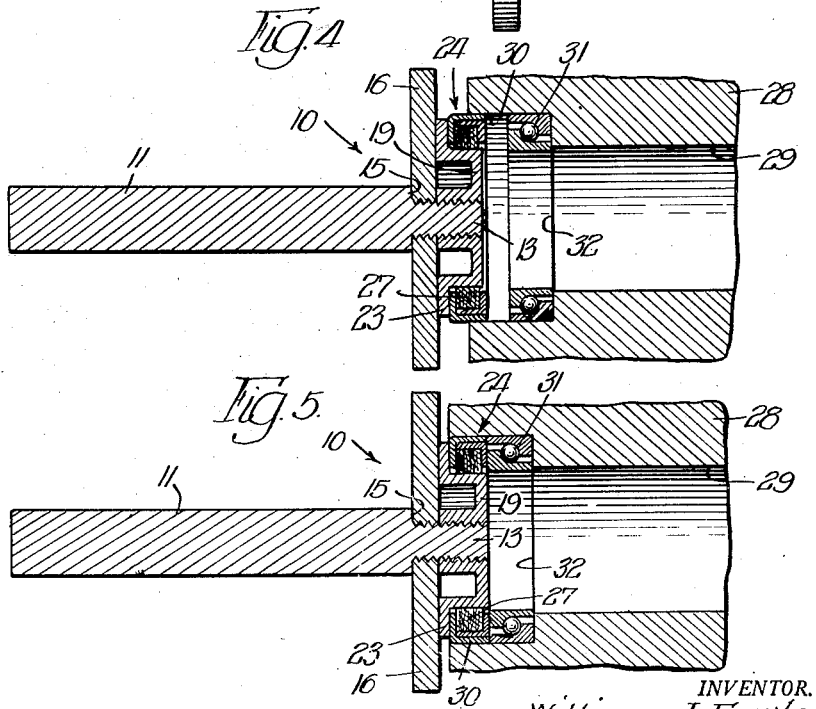
INVENTOR.
William J. Fowler,
BY
Cromwell, Greist & Warden
ATTYS

United States Patent Office 2,860,535
Patented Nov. 18, 1958

2,860,535

SEAL INSTALLATION TOOL

William J. Fowler, Chicago, Ill., assignor to Chicago Rawhide Manufacturing Company, Chicago, Ill., a corporation of Illinois Application February 20, 1956, Serial No. 566,622

12 Claims. (Cl. 81—8.1)

The present invention relates generally to an oil seal installation tool for use in installing grease retaining seals efficiently and without damage to the sealing member in the bores of housings. More specifically, the present invention is directed to a hand tool provided with removable means including a seal mounting means adapted to receive a seal thereon, which tool is adapted to bring about the installation of the seal maintained by said mounting means in press-fitted relation in the bore of a housing prior to the introduction of a shaft thereinto.

It is an object of the present invention to provide an improved manually operated oil seal installation tool for use in the installation of grease retaining seals in the bore of a housing, which installation may be carried out by means of the tool in an efficient manner without damage to the sealing member, and which tool is provided with seal mounting means which are readily interchangeable for use with seals of varying sizes to bring about efficient installation thereof.

Another object is to provide an oil seal installation tool capable of highly efficient use in the installation of grease retaining seals of varying shaft diameter, which tool is simply constructed and readily adapted for low cost manufacture.

Other objects not specifically set forth will become apparent from the following detailed description made in conjunction with the drawing wherein:

Fig. 1 illustrates the completely assembled hand tool of the present invention in side elevation;

Fig. 2 is a front elevation of the assembled tool;

Fig. 3 is an exploded view in partial vertical section illustrating all of the elements making up the tool in the order of their assembly and in combination with a known type of seal;

Fig. 4 is a vertical sectional view of the assembled tool with a seal mounted thereon illustrating the first stage of the seal installation operation wherein the seal by use of the tool is initially introduced into the bore of a housing; and Fig. 5 is a view in vertical section similar to Fig. 4 illustrating the final stage of the seal installation operation wherein the seal is completely installed in its press-fitted operative position within the bore of the housing.

The seal installation tool of the present invention, generally designated by the numeral 10, is a hand tool which is made up of a position directing handle 11 which is provided about the outer periphery thereof with a knurled section 12. The forward radial face of the handle 11 is provided with an axially extending integral mounting stud 13 which is provided with threads 14 about the outer periphery thereof and which is of reduced diameter as compared with the diameter of the handle 11 to form therebetween a radially extending annular shoulder 15. The tool 10 is further provided with a pressure distributing plate 16 which is in the form of a disk having a centrally located threaded aperture 17 extending therethrough adapted for threaded engagement with the stud 13. The disk 16 is of a diameter substantially greater than the diameter of the handle 11.

A seal mounting means or adaptor 18 forms the final component of the tool 10. The adaptor 18 is provided with a central axially forwardly extending annular portion 19 which in turn is provided centrally thereof with a rearwardly axially extending sleeve portion 20 having a centrally located axially extending threaded aperture 21 extending therethrough. The central portion 19 is defined by an axially extending annular wall 22 which in turn is provided at its margin with an integral radially extending annular flange 23. The axially extending annular wall portion 22 is adapted to receive about the outer periphery thereof a sealing element 24 which may be of any known design. The sealing element 24 illustrated in the drawing is a felt seal which is formed from telescoped casing members 25 and 26 which form a housing for retaining a felt sealing ring 27.

In assembling the tool 10, the plate 16 is threadedly advanced onto the stud 13 until the rear surface thereof abuts the shoulder 15. The adaptor 18 is then threadedly advanced onto the stud 13 until its rear face abuts the forward face of the disk 16. The seal 24 is then inserted about the outer periphery of the forwardly extending central portion 19 of the adaptor 18 and the tool is ready for use in the installation of the seal 24 within the bore of a housing.

In Figs. 4 and 5, two stages of the seal installation operation are shown. For purposes of illustration a portion of a housing 28 is shown as including a shaft-receiving bore 29 which has an end portion 30 of increased diameter as defined by a radially extending shoulder 32 having mounted therein a bearing 31 and adapted to receive the seal 24. The stage of the operation shown in Fig. 4 illustrates the initial introduction of the seal 24 within the seal-receiving bore 30 of the housing 28. The stage of the installation operation shown in Fig. 5 illustrates the positioning of the seal in its press-fitted operative position in abutting relation with the bearing 31.

In bringing about the installation of the seal 24, the handle 11 is grasped by the operator and by manipulation of the tool 10 the seal 24 is aligned with the seal-receiving bore 30. As the outer diameter of the seal 24 is slightly greater than the inner diameter of the bore 30 it must be forced into the bore. To bring this about, the rear radial face of the handle 11 may be used to receive the blows of a hammer or any other suitable tool in applying to the tool 10 the force necessary to properly seat the seal in its operative position. The force necessary to install the seal 24 is transmitted equally throughout its entire area by the pressure distributing plate 16 which backs up the radial annular flange 23 of the adaptor 18 by reason of its intimate abutting relation therewith. As a result, pressure applied to the seal 24 resulting either from the manual efforts of the operator of the tool 10 or as a result of blows received by the rear face of the handle 11 forces the seal 24 into the bore 30 into press-fitted relation therewith and into abutment with the bearing 31. The tool 10 with its threadedly attached pressure distributing plate 16 and adaptor 18 is then withdrawn out of contact with the seal 24 and the seal, due to its press-fitted engagement with the bore 30, is retained in its operative position within the housing 28. A suitable shaft may then be inserted to complete the assembling of the operative parts associated with the housing 28.

A feature of particular importance of the tool 10 is the adaptor 18, a number of which may be readily and inexpensively provided each having a central portion 19 of a different outside diameter. By equipping the tool 10 with a number of adaptors having seal mounting portions of varying outside diameter a single tool may be used in installing seals of different shaft size. As a result the tool 10 may be supplied with a kit including a number of adaptors 18 of different sizes for use with seals of varying shaft sizes. With the provision of a number of such adaptors, each being provided with the axially extending sleeve portion 20 including the threaded aperture 21, the proper one may be readily selected and mounted on the tool 10 for use with a particular seal to bring about the installation thereof in a bore.

In designing the adaptors 18 it has been found preferable to provide the seal mounting central portion 19 of each adaptor with an outside diameter slightly under shaft size. For example, where a felt seal such as the seal 24 shown in the drawing is installed, it is preferred to make use of an adaptor 18 which is provided with a seal mounting central portion 19 having an outer diameter approximately 1/32 of an inch under shaft size. In the instance where a leather seal is to be installed, it is preferred that the outside diameter of the seal mounting portion of the adaptor be approximately 3/32 of an inch under shaft size. The adaptor should be designed to frictionally receive the seal to an extent that the seal is properly maintained in its operative position on the adaptor. However, the diameter of the seal mounting portion should be such that the seal is not damaged by the necessity of using an undue amount of force to mount the seal thereon.

As will be noted in Figs. 4 and 5, the outside diameter of the annular flange 23 of the adaptor 18 is slightly less than the diameter of the bore 30. It has been found preferable to maintain the outside diameter of the flange 23 approximately 0.025 of an inch less than the outside diameter of the seal carried by the adaptor. By this arrangement it is possible to force the seal into the bore to an extent that the outer face of the housing will abut the forward face of the disk 16 without the radial flange 23 of the adaptor 18 interfering with the installation procedure.

It has been found that the adaptor 18 may be readily formed from a plastic material of adequate strength such as a butyrate plastic. By forming the adaptor 18 from plastic material a number of such adaptors designed for use with seals of varying shaft size may be cheaply provided with each tool and the total weight of the tool is kept at a minimum. Obviously the tool 10 of the present invention may be used with many different types of housings for the purpose of installing seals therein. One of such uses includes the installation of seals in the bores of front wheel housings but it is not intended that the tool should be limited to this use alone.

Obviously many modifications and variations of the invention as hereinbefore set forth may be made without departing from the spirit and scope thereof, and therefore only such limitations should be imposed as are indicated in the appended claims.

I claim:

1. A hand tool for use in the installation of seals in the bore of a housing, said tool comprising a seal position directing handle being provided at an end thereof with an axial extension of reduced diameter defining a radial shoulder on said handle, a pressure distributing means on said extension in rear face abutment with said shoulder, and a seal mounting means removably received on said extension in rear face abutment with said pressure distributing means, said pressure distributing means being positioned intermediate said handle and said seal mounting means to distribute pressure applied to said handle with respect to a seal carried by said seal mounting means upon the insertion of the same within said bore.

2. A hand tool for use in the installation of seals in the bore of a housing, said tool comprising a seal position directing handle being provided at an end thereof with an axial extension of reduced diameter defining a radial shoulder on said handle, a pressure distributing means on said extension in rear face abutment with said shoulder, said pressure distributing means having a greater radial dimension than the bore of said housing, and a seal mounting means removably received on said extension in rear face abutment with said pressure distributing means, said pressure distributing means being positioned intermediate said handle and said mounting means to distribute pressure applied to said handle with respect to a seal carried by said seal mounting means upon the insertion of the same within said bore.

3. A hand tool for use in the installation of seals in the bore of a housing, said tool comprising a seal position directing handle being provided at an end thereof with a projection, a pressure distributing means on said projection, and a seal mounting means removably received on said projection, said seal mounting means being provided with an annular seal receiving portion, the rear margin of said seal receiving portion being defined by a radially extending annular flange, said pressure distributing means positioned intermediate said handle and said seal mounting means and in abutment with said handle and said annular flange to distribute pressure applied to said handle with respect to a seal carried by said seal mounting means upon insertion of the same within said bore.

4. A hand tool for use in the installation of seals in the bore of a housing, said tool comprising a seal position directing handle being provided at an end thereof with a projection, a pressure distributing means on said projection, and a seal mounting means removably received on said projection, said seal mounting means being provided with an annular seal receiving portion, the rear margin of said seal receiving portion being defined by a radially extending annular flange, said annular flange having an outer diameter less than the diameter of said bore, said pressure distributing means positioned intermediate said handle and said flange and in abutment with said handle and said flange to distribute pressure applied to said handle with respect to a seal carried by said seal mounting means upon the insertion of the same within said bore.

5. A hand tool for use in the installation of seals in the bore of a housing, said tool comprising a seal position directly handle being provided at an end thereof with a projection, a pressure distributing means on said projection, said pressure distributing means having a greater radial dimension than the bore of said housing, and a seal mounting means removably received on said projection, said seal mounting means being provided with an annular seal receiving portion, the rear margin of said seal receiving portion being defined by a radially extending annular flange, said pressure distributing means positioned intermediate said handle and said flange and in abutment with said handle and said flange to distribute pressure applied to said handle with respect to a seal carried by said seal mounting means upon the insertion of the same within said bore.

6. A hand tool for use in the installation of seals in the bore of a housing, said tool comprising a seal position directing handle being provided at an end thereof with a projection, a pressure distributing means on said projection, said pressure distributing means having a greater radial dimension than the bore of said housing, and a seal mounting means on said projection, said seal mounting means being provided with an annular seal receiving portion, the rear margin of said seal receiving portion being defined by a radially extending annular flange, said annular flange having an outer diameter less than the diameter of said bore, said pressure distributing means positioned intermediate said handle and said flange to distribute pressure applied to said handle with respect to a seal carried by said seal mounting means upon the insertion of the same within said bore.

7. A seal installation tool for use in installing a seal in press-fit relation with the bore of a housing, said tool including a handle being provided at one end thereof with an axially extending externally threaded stud surrounded at its junction with said handle by a radially extending shoulder, a pressure distributing disk threadedly received by said stud and in abutting engagement with said shoulder, and an adaptor threadedly received by said stud in abutting engagement with said disk, said adaptor provided with a forwardly projecting annular portion having its rear margin integrally formed with an annular radially directed flange, the outer periphery of said annular portion adapted to receive a seal thereabout.

8. A seal installation tool for use in installing a seal in press-fit relation with the bore of a housing, said tool including a handle of substantial axial length being provided at one end thereof with an axially extending externally threaded stud surrounded at its junction with said handle by a radially extending shoulder, a pressure distributing disk threadedly received by said stud and in abutting engagement with said shoulder, said disk having a diameter greater than the diameter of said bore, and an adaptor threadedly received by said stud, said adaptor provided with a forwardly projecting annular portion having its rear margin integrally formed with an annular radially directed flange, the rear face of said flange being in abutting engagement with the forward face of said disk, the outer periphery of said annular portion adapted to receive a seal thereabout.

9. A seal installation tool for use in installing a seal in press-fit relation with the bore of a housing, said tool including a handle being provided at one end thereof with an axially extending externally threaded stud surrounded at its junction with said handle by a radially extending shoulder, a pressure distributing disk threadedly received by said stud and in abutting engagement with said shoulder, said disk having a diameter greater than the diameter of said bore, and an adaptor threadedly received by said stud, said adaptor provided with a forwardly projecting annular portion having its rear margin integrally formed with an annular radially directed flange, said flange having an outer diameter less than the diameter of said bore, the rear face of said flange being in abutting engagement with the forward face of said disk, the outer periphery of said annular portion adapted to receive a seal thereabout.

10. A seal installation tool for use in installing a seal in press-fit relation with the bore of a housing, said tool including a handle of substantial axial length being provided at one end thereof with an axially extending externally threaded stud surrounded at its junction with said handle by a radially extending shoulder, a pressure distributing disk threadedly received by said stud and in abutting engagement with said shoulder, said disk having a diameter greater than the diameter of said bore, and an adaptor threadedly received by said stud, said adaptor provided with a forwardly projecting annular portion having its rear margin integrally formed with an annular radially directed flange, said flange having an outer diameter less than the diameter of said bore, the rear face of said flange being in abutting engagement with the forward face of said disk, the outer periphery of said annular portion adapted to receive a seal thereabout, said annular portion having an outer diameter slightly less than that of a shaft to be sealed in said bore.

11. A hand tool for use in the installation of seals in the bore of a housing, said tool being provided with a handle portion carrying a radially extending pressure distributing means at one end thereof, and a removable seal mounting means carried by said tool in axial abutment with said pressure distributing means and mounted outwardly of the same at said one end of said handle portion.

12. A hand tool for use in the installation of seals in the bore of a housing, said tool being provided with a handle portion carrying a removable radially extending pressure distributing means at one end thereof, and a removable seal mounting means carried by said tool in axial abutment with said pressure distributing means and mounted outwardly of the same at said one end of said handle portion, said seal mounting means being centrally located with respect to said handle portion and said pressure distributing means.

References Cited in the file of this patent

UNITED STATES PATENTS

| | | |
|---|---|---|
| 1,420,196 | Kohler | June 20, 1922 |
| 1,719,420 | Blain | July 2, 1929 |
| 2,266,874 | Larson | Dec. 23, 1941 |